United States Patent
Nakauchi

(10) Patent No.: US 8,868,366 B2
(45) Date of Patent: Oct. 21, 2014

(54) CALCULATION METHOD AND CALCULATION APPARATUS

(75) Inventor: Akihiro Nakauchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 639 days.

(21) Appl. No.: 12/904,501

(22) Filed: Oct. 14, 2010

(65) Prior Publication Data

US 2011/0093228 A1 Apr. 21, 2011

(30) Foreign Application Priority Data

Oct. 15, 2009 (JP) .................................. 2009-238659

(51) Int. Cl.
*G01C 17/38* (2006.01)
*G01B 21/04* (2006.01)

(52) U.S. Cl.
CPC ................................... *G01B 21/045* (2013.01)
USPC ................. 702/94; 702/97; 702/155; 702/179

(58) Field of Classification Search
USPC .............. 702/94, 97, 155, 179; 382/103, 165; 362/518; 359/626, 627; 348/46, 222.1
See application file for complete search history.

(56) References Cited

U.S. PATENT DOCUMENTS

| | | | |
|---|---|---|---|
| 6,956,657 B2 | 10/2005 | Golini et al. | |
| 7,324,904 B2 * | 1/2008 | Floyd et al. | 702/81 |
| 7,630,006 B2 * | 12/2009 | DeLuca et al. | 348/241 |
| 8,108,119 B2 * | 1/2012 | Southall et al. | 701/96 |
| 8,212,227 B2 * | 7/2012 | Watanabe et al. | 250/492.3 |
| 8,284,393 B2 * | 10/2012 | Takahashi et al. | 356/237.1 |

FOREIGN PATENT DOCUMENTS

| | | |
|---|---|---|
| JP | 02-259509 A | 10/1990 |
| JP | 11-14322 A | 1/1999 |
| JP | 2001-066123 A | 3/2001 |
| JP | 2002-181517 A | 6/2002 |
| JP | 2004-286561 A | 10/2004 |
| JP | 2008-241506 A | 10/2008 |

OTHER PUBLICATIONS

Mercier, R. et al., "Two-flat method for bi-dimensional measurement of absolute departure from the best sphere", Pure Appl. Opt., 6 (1997), pp. 117-126, Oct. 4, 1996.
Nakauchi, Akihiro. "Measuring Method and Measuring Apparatus," Specification and Drawings of unpublished related co-pending U.S. Appl. No. 12/944,187, filed Nov. 11, 2010, pp. 1-37.
Japanese Office Action for corresponding JP 2009-238659, dated Aug. 30, 2013.
Japanese Office Action for JP 2010-242653, mail date Mar. 14, 2014. Cited in related U.S. Appl. No. 12/944,187.

* cited by examiner

*Primary Examiner* — Elias Desta
(74) *Attorney, Agent, or Firm* — Rossi, Kimms & McDowell LLP

(57) ABSTRACT

The present invention provides a method of calculating a surface shape of a target surface, including the steps of defining, as a measurement target region, each of a plurality of regions on the target surface in which adjacent regions overlap each other, and obtaining data that give the heights at the plurality of positions in each of the plurality of regions, and removing, for each of the plurality of regions, an average data from the data that are obtained in the step of obtaining the data and give the heights at the plurality of positions in each of the plurality of regions, thereby generating correction data for each of the plurality of regions.

6 Claims, 3 Drawing Sheets

F I G. 4A
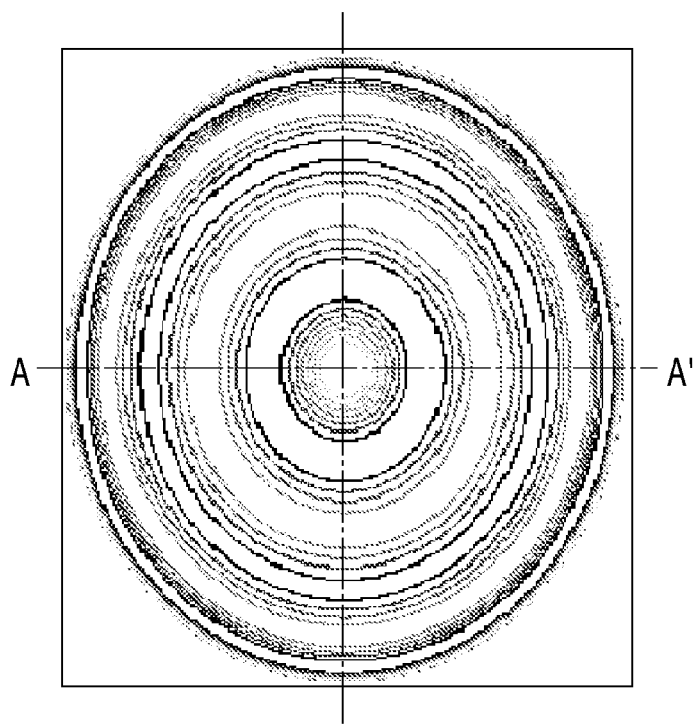
F I G. 4B
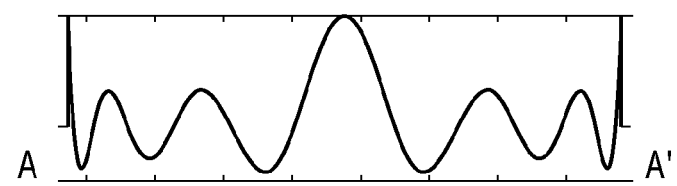
F I G. 5
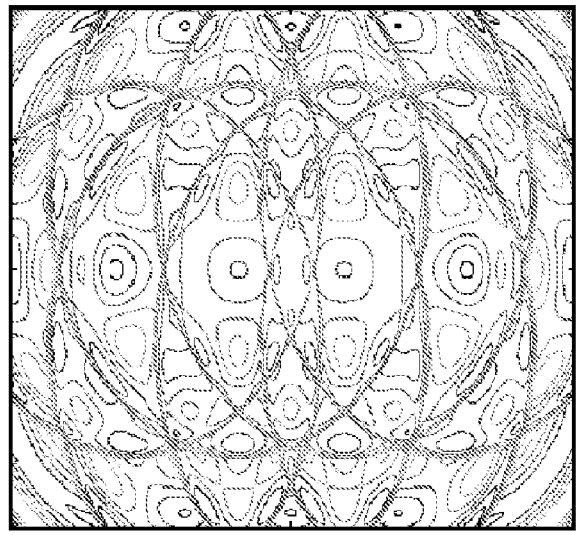

CALCULATION METHOD AND CALCULATION APPARATUS

BACKGROUND OF THE INVENTION

1. Field of the Invention

The present invention relates to a surface shape calculation method and apparatus.

2. Description of the Related Art

A stitching method or synthetic aperture method using an interferometer is known as a method of measuring the surface shape (planar shape) of an optical element such as a large-diameter mirror or lens. In the stitching method using an interferometer, it is important to separate the system error of the interferometer from the surface shape of the target surface (R. Mercier et. al., "Two-flat method for bi-dimensional measurement of absolute departure from the best sphere", Appl. Opt., 6 (1997), 117 ("Reference 1"). Reference 1 discloses a technique of measuring the surface shape of a target surface while relatively shifting the target surface and the reference surface, and separating a system error from the surface shape of the target surface based on measured values at portions where the measured values before and after the shift overlap.

U.S. Pat. No. 6,956,657 ("Reference 2") discloses a technique of measuring the surface shapes of a plurality of regions (sub aperture regions) each smaller than the whole target surface and combining the measured values of the plurality of regions, thereby obtaining the surface shape of the target surface. Note that in Reference 2, the system error is separated from the target surface shape based on measured values of portions where the plurality of regions overlap, as in Reference 1. More specifically, the measured value of the j-th region is represented by the sum of three elements, that is, the surface shape of the target surface, the alignment error between the interferometer and the target surface, and the system error. Then, the alignment error and the system error are obtained by the least squares method such that the difference between the measured values of portions where adjacent regions overlap is minimized.

Note that in the conventional techniques of references 1 and 2, the system error is expressed by the sum of polynomials such as Zernike polynomials or trigonometric functions.

However, since the conventional techniques use the stitching method that inputs the measured value of each of the plurality of regions of the target surface, an error is generated in the surface shape of the target surface to be measured due to restrictions on the number of terms to be used in polynomials for expressing the system error. That is, since a system error that cannot be expressed by the number of terms to be used in polynomials remains as an error, the accuracy of measuring the surface shape of the target surface is reduced.

This problem can be avoided by sufficiently increasing the number of terms of polynomials for expressing the system error. In general, however, if the number of terms of polynomials that are fitting variables increases, the matrix to be used in the least squares method becomes large. This leads to a longer calculation time or shortage of computer memory capacity. Hence, in the conventional techniques, the number of terms to be used in polynomials for expressing a system error needs to be limited, and it is therefore difficult to obtain a sufficient measurement accuracy.

SUMMARY OF THE INVENTION

The present invention provides a technique of generating new data that enables accurate measurement of the surface shape of a target surface.

According to one aspect of the present invention, there is provided a method of calculating a surface shape of a target surface, including the steps of defining, as a measurement target region, each of a plurality of regions on the target surface in which adjacent regions overlap each other, and causing an image sensor to detect an interference pattern formed by measurement light reflected by the measurement target region and reference light reflected by a reference surface so as to measure heights of the target surface at a plurality of positions in the measurement target region, thereby obtaining data that give the heights at the plurality of positions in each of the plurality of regions, dividing a result obtained by adding, for the plurality of positions, the data that are obtained in the step of obtaining the data and give the heights at the plurality of positions in each of the plurality of regions by the number of the plurality of regions, thereby generating average data that averages the data that give the heights at the plurality of positions in each of the plurality of regions, removing, for each of the plurality of regions, the average data generated in the step of generating the average data from the data that are obtained in the step of obtaining the data and give the heights at the plurality of positions in each of the plurality of regions, thereby generating correction data for each of the plurality of regions, and combining the correction data for the plurality of regions generated in the step of generating the correction data, thereby obtaining the surface shape of the target surface.

Further aspects of the present invention will become apparent from the following description of exemplary embodiments with reference to the attached drawings.

BRIEF DESCRIPTION OF THE DRAWINGS

FIGS. 4A and 4B are views showing an example of the system error of the measuring apparatus shown in FIG. 1.

FIG. 5 is a view showing measurement errors generated when the surface shape of a target surface is measured using the stitching method.

DESCRIPTION OF THE EMBODIMENTS

Figure 1:
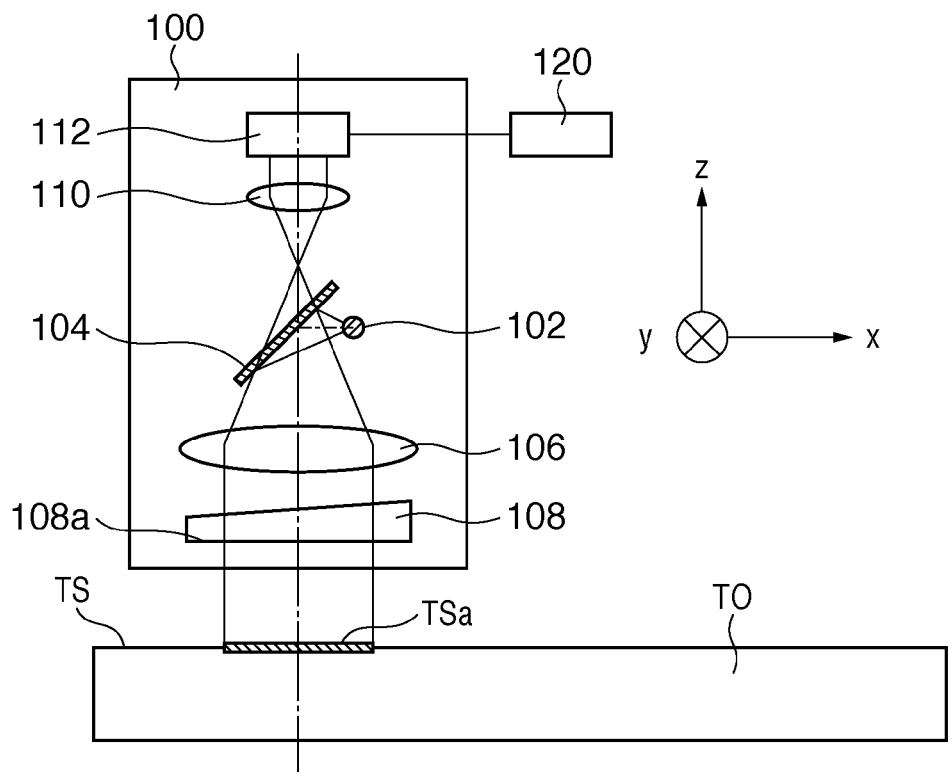
FIG. 1 is a view showing the arrangement of a measuring apparatus that functions as a calculation apparatus according to an aspect of the present invention.

Preferred embodiments of the present invention will be described below with reference to the accompanying drawings. Note that the same reference numerals denote the same members throughout the drawings, and a repetitive description thereof will not be given.

FIG. 1 is a view showing the arrangement of a measuring apparatus 1 that functions as a calculation apparatus according to an aspect of the present invention. The measuring apparatus 1 fundamentally has the structure of a Fizeau interferometer, and measures the surface shape of a target surface TS of a target object TO. Note that the target surface TS of the target object TO is assumed to be plane in this embodiment.

The measuring apparatus 1 of this embodiment includes a measuring unit 100 including a light source 102, half mirror 104, collimator lens 106, TF lens 108 with a reference surface 108a, imaging lens 110, and imaging element (image sensor) 112, and a processing unit 120. Note that "TF" of the TF lens stands for "Transmission Flat".

Light (divergent light) emitted by the light source 102 is reflected by the half mirror 104 so as to become incident on the collimator lens 106. The light that has entered the collimator lens 106 is converted into a parallel light and input to the TF lens 108.

Some components of the light entered to the TF lens 108 are reflected (vertically reflected) by the reference surface 108a so as to return through almost the same optical path in the TF lens 108 and the collimator lens 106 and enter the half mirror 104. Note that the light reflected by the reference surface 108a of the TF lens 108 will be referred to as reference light hereinafter.

On the other hand, the light transmitted through the reference surface 108a of the TF lens 108 is reflected (vertically reflected) by the target surface TS so as to return through almost the same optical path in the TF lens 108 and the collimator lens 106 and enter the half mirror 104. Note that the light reflected by the target surface TS will be referred to as measurement light hereinafter.

The reference light reflected by the reference surface 108a and the measurement light reflected by the target surface TS are transmitted through the half mirror 104 and enter, via the imaging lens 110, to the imaging element 112 formed from a CCD or the like. The imaging element 112 detects an interference pattern (interference fringes) formed by the reference light and measurement light.

The interference pattern detected by the imaging element 112 is sent to the processing unit 120. The processing unit 120 performs processing of obtaining the height (surface shape) of the target surface TS based on the interference pattern from the imaging element 112, as will be described later.

To measure the surface shape of the entire target surface TS, the measuring apparatus 1 of this embodiment performs measurement by sequentially setting, as a measurement target region TSa, each of a plurality of regions obtained by dividing the entire target surface TS such that at least adjacent regions overlap each other. For example, the measuring apparatus 1 measures the measurement target region TSa while driving the measuring unit 100 in the x-y plane relative to the target surface TS so that the measurement target region TSa can cover the entire target surface TS. Instead of driving the measuring unit 100, the target surface TS may be driven relative to the measuring unit 100. Note that any arrangement well known to those skilled in the art is applicable as the driving mechanism for driving the measuring unit 100 (or target surface TS).

When driving the measuring unit 100 (or target surface TS), alignment needs to be performed to minimize the alignment error or orientation error between the measuring unit 100 and the target surface TS (measurement target region TSa). More specifically, alignment is performed such that the backward path of the measurement light reflected by the target surface TS (measurement target region TSa) becomes almost the same as the forward path. Note that any arrangement well known to those skilled in the art is applicable as the alignment mechanism for aligning the measuring unit 100 with the target surface TS.

Figure 2:
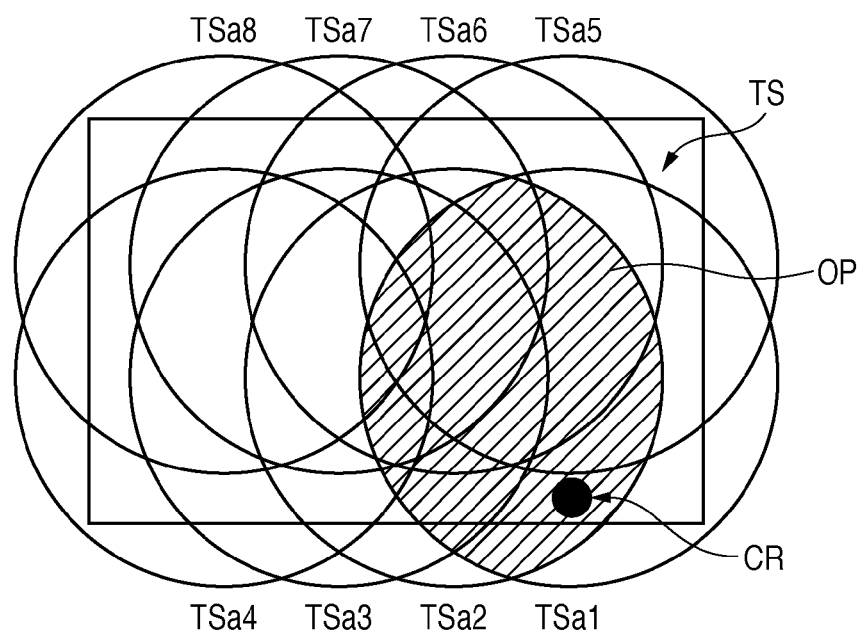
FIG. 2 is a view showing the relationship between a target surface and a measurement target region in the measuring apparatus shown in FIG. 1.

FIG. 2 is a view showing the relationship between the target surface TS and the measurement target region TSa. In this embodiment, as shown in FIG. 2, the target surface TS is a rectangular region, and the measurement target region TSa measurable by the measuring apparatus 1 in one process is a circular region (measurement target regions TSa1 to TSa8). Note that as described above, the measurement target regions TSa1 to TSa8 are set such that at least adjacent regions overlap each other. In FIG. 2, the eight (2 rows×4 columns) measurement target regions TSa1 to TSa8 are set to cover the entire target surface TS. In FIG. 2, a portion OP where the measurement target regions TSa1 and TSa2 overlap is hatched.

A model that divides the entire target surface TS into a plurality of regions, that is, the number and arrangement of measurement target regions are determined so as to maximize the effect of averaging the measurement results in the measurement target regions (to be described later). For example, assume that measurement results in two measurement target regions spaced apart by $\Delta$ are averaged. Letting k be the spatial frequency, the amplitude of a component of the spatial frequency k on the target surface decreases in proportion to $\cos(k \cdot \Delta)$. At this time, appropriately setting $\Delta$ allows a reduction in the characteristic spatial frequency component on the target surface. When the magnitude and direction of $\Delta$ are set variously, the effect of averaging the measurement results in the measurement target regions can further be improved. This can be implemented by setting nonuniform intervals between the plurality of measurement target regions. Even when the measurement target regions are arranged at a uniform interval, a plurality of $\Delta s$ can be implemented by making the portion where adjacent measurement target regions overlap sufficiently large so that three or more measurement target regions overlap.

Note that the information of the target surface shape is necessary for setting the number and arrangement of measurement target regions. The target surface shape is the surface shape of the target surface TS in each measurement target region for the reference surface 108a of the TF lens 108. The target surface shape is unknown before actually measuring the target surface TS. However, when setting the number and arrangement of measurement target regions, the target surface shape is temporarily determined based on the characteristics of the polisher and grinder used to process the target surface TS and the surface standards of the target surface TS. The target surface shape may temporarily be determined by appropriately setting the number and arrangement of measurement target regions and performing measurement using the stitching method in advance. The effect of averaging measurement results in the measurement target regions is calculated for the thus temporarily determined target surface shape, thereby setting the number and arrangement of measurement target regions.

Figure 3:
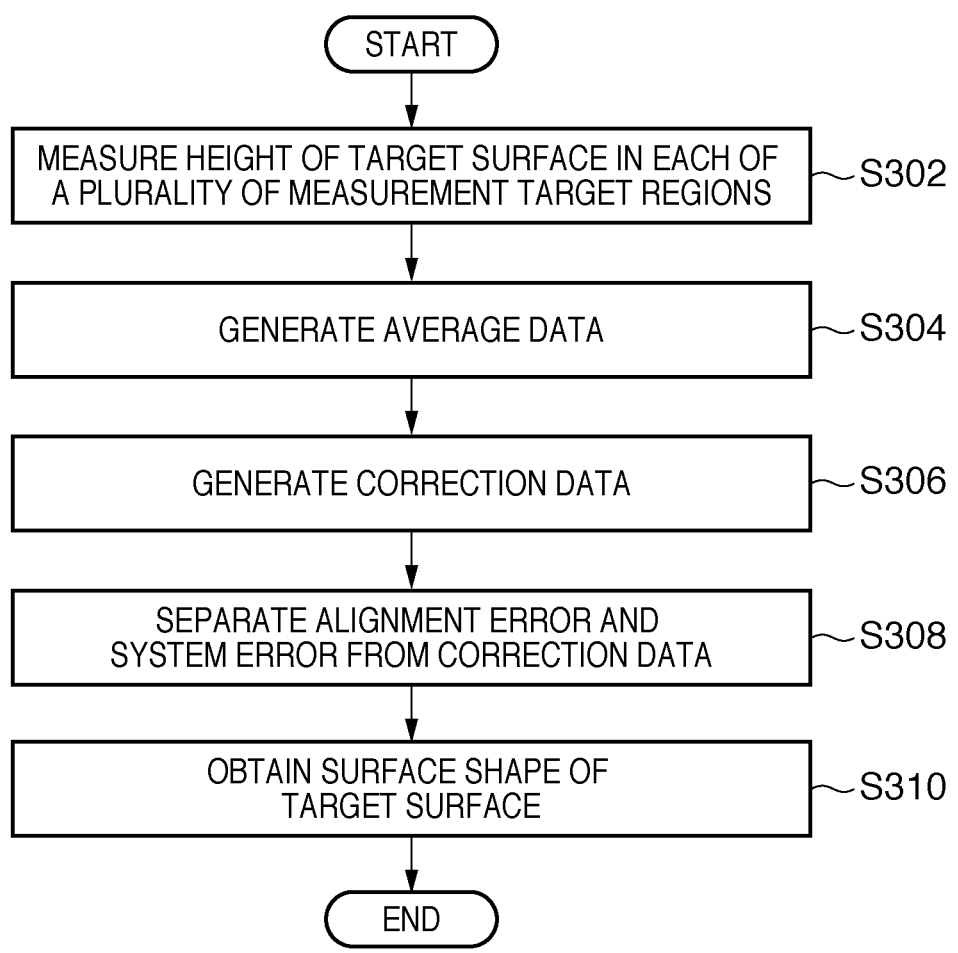
FIG. 3 is a flowchart for explaining measurement of the surface shape of a target surface by the measuring apparatus shown in FIG. 1.

Measurement (calculation) of the surface shape of the target surface TS by the measuring apparatus 1 will be described below with reference to FIG. 3. Note that processing executed by the processing unit 120, that is, processing of obtaining the surface shape of the target surface TS based on measurement results in the measurement target regions will now be explained in detail.

In step S302 (obtaining step), the height of the target surface TS in each of the plurality of measurement target regions is measured. More specifically, each of the plurality of regions obtained by dividing the entire target surface TS such that at least adjacent regions overlap each other is sequentially set as the measurement target region TSa. The imaging element 112 detects an interference pattern formed by measurement light reflected by the measurement target region TSa and reference light reflected by the reference surface 108a, thereby measuring the heights of the target surface TS at a plurality of positions in the measurement target region TSa. In this embodiment, the entire target surface TS is divided into the eight measurement target regions TSa1 to TSa8, as shown in FIG. 2. Hence, in step S302, data that give heights at a plurality of positions in each of the measurement target regions TSa1 to TSa8 are obtained as measurement results $F_i(x,y)$ in the measurement target regions TSa1 to TSa8. Note that the suffix i represents each measurement target region, which takes values 1 to 8 in this embodiment, and (x,y) represents coordinates on the target surface.

The coordinates of the measurement results Fi(x,y) are converted from coordinates on the detection plane of the imaging element 112 for detecting the interference pattern into coordinates on the target surface based on the optical magnification and distortion of the measuring apparatus 1, and the relative positional relationship between the measuring unit 100 and the target surface TS in measuring each measurement target region. If the target surface TS is a spherical surface or aspherical surface, complex coordinate conversion is necessary. Generally, to convert the coordinate system on the detection plane of the imaging element 112 into the rectangular coordinate system on which the target surface TS is arranged, two points need to be taken into consideration. First, spherical waves from the measuring apparatus 1 (interferometer) generally form a coordinate system in which the number of apertures of the optical system is uniform. Second, the measurement target region TSa is driven not in the x-y plane but along the target surface TS.

In step S304 (first generation step), the measurement results Fi(x,y) in the measurement target regions TSa1 to TSa8 are averaged to generate average data. More specifically, the data obtained in step S302, which give the heights at the plurality of positions in each of the measurement target regions TSa1 to TSa8, are added for the plurality of positions, and the sum is divided by the number of measurement target regions, thereby generating average data Fa(x,y) which is given by $$Fa(x,y)=\text{Sum0}[Fi(x-xi,y-yi),\{i=1,N\}]/N \quad (1)$$

where Sum0[ ] on the right-hand side is a function representing summing all measurement results Fi (i is 1 to N), (xi,yi) are coordinates representing the central position of a measurement target region when measuring the i-th measurement target region (or coordinates representing the position of the measuring unit 100 relative to the target surface TS). Step S304 aims at extracting the system error of the measuring apparatus 1, as will be described later. To do this, averaging is performed while making the centers of measurement results in the measurement target regions match.

In step S306 (second generation step), correction data for each of the plurality of measurement target regions is generated by removing the average data Fa(x,y) generated in step S304 from each of the measurement results Fi(x,y) in the measurement target regions obtained in step S302. More specifically, correction data Mi(x,y) is generated by $$Mi(x,y)=Fi(x,y)-Fa(x+xi,y+yi) \quad (2)$$

The correction data generated in step S306 is obtained by removing the system error (higher-order component) of the measuring apparatus 1 from the measurement result in each measurement target region, as will be described later. Hence, using the correction data in the stitching method allows the surface shape of the target surface TS to be accurately obtained.

In steps S308 and S310, the correction data for each of the plurality of measurement target regions generated in step S306 is input in place of the measurement result Fi(x,y) in each measurement target region, and the surface shape of the target surface TS is obtained using the stitching method.

More specifically, in step S308, the alignment error and system error are separated from the correction data Mi(x,y) generated in step S306. First, let AEi be the alignment error that is the relative orientation component between the measuring unit 100 and the target surface TS when measuring the i-th measurement target region, and SE be the system error that has the same value in all measurement target regions. Using the correction data Mi(x,y), a surface shape Pi of the target surface TS in the i-th measurement target region is represented by $$Pi(x,y)=Mi(x,y)-AEi(x-xi,y-yi)-SE(x-xi,y-yi) \quad (3)$$

Using equation (3), a merit function D is defined by $$D=\text{Sum1}[((Mi(x,y)-Mj(x,y))-(AEi(x-xi,y-yi)-AEj(x-xj,y-yj))-(SE(x-xi,y-yi)-SE(x-xj,y-yj)))^2] \quad (4)$$

The merit function D is a function representing the square of the difference between the surface shape Pi of the target surface TS in the i-th measurement target region and a surface shape Pj of the target surface TS in the j-th measurement target region at the overlap portion.

Sum1[ ] in equation (4) is a function that expresses sums concerning all combinations of two measurement target regions selected from N measurement target regions, and sums concerning the coordinates (x,y) on the target surface. An effective one of the sums concerning the coordinates (x,y) on the target surface corresponds to the overlap portion of the i-th and j-th measurement target regions. For example, in FIG. 2, it is the sum of the portion OP where the measurement target regions TSa1 and TSa2 overlap.

The targets to be obtained are the alignment error AEi and system error SE which minimize the merit function D represented by equation (4). The alignment error AEi is given by $$AEi(x,y)=a1i+a2i\cdot x+a3i\cdot y \quad (5)$$

The system error SE is given by $$SE(x,y)=\text{Sum2}[aj\cdot fj(x,y)] \quad (6)$$

As described above, the alignment error AEi is a component generated by the orientation error between the measuring unit 100 and the target surface TS. If the target surface TS is plane, the alignment error AEi is the sum of a piston component and tilt components. That is, in equation (5), a1i is the piston component when measuring the i-th measurement target region, and a2i and a3i are the tilt components when measuring the i-th measurement target region. Note that if the target surface TS is a spherical surface, a power component is included in the alignment error AEi represented by equation (5).

Equations (5) and (6) are substituted into equation (4), and the variables a1i, a2i, a3i, and aj are obtained using, for example, the least squares method such that the merit function D is minimized. A maximum degree J of the polynomials for expressing the system error is determined in consideration of the calculation time, restrictions on the memory capacity of the computer, and the like. For example, if Fringe Zernike polynomials are used, J=36 is appropriate. A state-of-the-art computer can obtain the variables in a realistic calculation time and memory capacity up to J=169.

The thus obtained variables a1i, a2i, a3i, and aj are substituted into equations (5) and (6). Data Mi'(x,y) is obtained by separating the alignment error AEi and the system error SE from the correction data Mi(x,y) in accordance with $$Mi'(x,y)=Mi(x,y)-AEi(x-xi,y-yi)-SE(x-xi,y-yi) \quad (7)$$

In step S310, the data Mi'(x,y) obtained in step S308 are combined to obtain the surface shape of the entire target surface TS. More specifically, a surface shape P(x,y) of the entire target surface TS is obtained by $$P(x,y)=\text{Sum0}[Mi'(x,y)/\text{Count}(x,y),\{i=1,N\}] \quad (8)$$

where Sum0[ ] represents the sum of all measurement target regions, and Count(x,y) represents the number of measurement target regions including the coordinates (x,y) on the target surface. For example, since coordinates CR shown in FIG. 2 are included in the measurement target regions TSa1 and TSa2, Count(x,y)=2.

The average data Fa(x,y) generated in step S304 will be described in detail. The measurement result Fi(x,y) in each measurement target region obtained in step S302 is represented by the sum of the surface shape of the target surface TS in the measurement target region, the alignment error when measuring the ith measurement target region, and the system error of the measuring apparatus 1, and given by $$Fi(x,y)=P(x,y)+AE0i(x,y)+SE0(x,y) \qquad (9)$$

where P(x,y), AE0i(x,y), and SE0(x,y) are the surface shape of the target surface TS in the measurement target region, the alignment error when measuring the ith measurement target region, and the system error of the measuring apparatus 1, respectively.

When equation (9) is substituted into equation (1), we obtain $$Fa(x,y)=\text{Sum}[P(x-xi,y-yi),\{i=1,N\}]/N+\text{Sum}[AE0i(x-xi,y-yi),\{i=1,N\}]/N+\text{Sum}[SE0(x-xi,y-yi),\{i=1,N\}] \qquad (10)$$

where Sum[ ] is the sum of N measurement target regions.

The first term on the right-hand side of equation (10) is the average of surface shapes at difference positions on the target surface. As described above, when the number and arrangement of measurement target regions are appropriately set, the first term on the right-hand side becomes almost zero. Especially, the high-frequency components of the target surface TS can effectively be averaged.

The second term on the right-hand side becomes almost zero if the N alignment errors AE0i are at randomly distributed. Note that in step S304, results obtained by removing the alignment errors from the measurement results in the measurement target regions in advance may be averaged, or the alignment errors may be removed after average data generation. In any case, the alignment errors included in the average data are separated in step S308.

The third term on the right-hand side represents the average of system errors. Since the system errors have the same value in all measurement target regions, the value does not change even after averaging, and represents the system error itself.

When the measurement results in the measurement target regions are averaged in the above-described way, the average data can accurately express the system error of the measuring apparatus 1. Especially, since the information of the target surface TS is easily eliminated for a spatial high-frequency component, the system error can accurately be obtained.

Note that the spatial high-frequency component corresponds to a higher-order term of polynomials when the system error is expressed by polynomials, as indicated by equation (6). In this embodiment, however, the higher-order component of the system error is accurately obtained in step S304, and the higher-order component of the system error is removed from the measurement result in step S306. Hence, the measurement accuracy can be improved even when the variable of the system error includes no higher-order polynomial in step S308.

On the other hand, it is difficult to make a spatial low-frequency component zero by averaging the measurement results. Hence, the average data does not represent the system error itself. However, since the lower-order component of the system error can be separated (corrected) in step S308, the surface shape of the target surface TS can accurately be obtained.

An effect obtained by causing the measuring apparatus 1 to measure the surface shape of the target surface TS will be described below with reference to FIGS. 4A, 4B, and 5. FIGS. 4A and 4B are views showing an example of the system error of the measuring apparatus 1. More specifically, FIG. 4A shows the contour lines of a system error. FIG. 4B shows the magnitude of the system error on a section taken along a line A-A' in FIG. 4A. In this embodiment, the system error of the measuring apparatus 1 is assumed to include only the 49th term of Zernike polynomials. Note that Fringe Zernike polynomials are used as the Zernike polynomials. Referring to FIGS. 4A and 4B, the maximum value of the system error is 1, and the PV value is about 1.4.

FIG. 5 is a view showing measurement errors when a measuring apparatus including the system error shown in FIGS. 4A and 4B measures the surface shape of the target surface TS using the stitching method. As is apparent from FIG. 5, the PV value of the measurement error is about 1.25, and errors corresponding to the period of the measurement target regions shown in FIG. 2 are generated. Note that in FIG. 5, the maximum degree of polynomials for expressing the system error is 48 of Zernike polynomials. For this reason, the 49th and subsequent terms of Zernike polynomials included in the system error cannot be corrected, and measurement errors shown in FIG. 5 are generated.

On the other hand, the measuring apparatus 1 of this embodiment accurately extracts the system error of high-frequency components shown in FIGS. 4A and 4B (S304). The system error of the high-frequency components is removed from the measurement results in the measurement target regions (S306). Then, the stitching method is used. It is therefore possible to accurately obtain the surface shape of the target surface TS.

Note that in this embodiment, an example has been described in which the target surface TS is planar. However, the target surface TS may be spherical or aspherical. In this case, as described above, although coordinate system conversion be complex, executing steps S302 to S310 of FIG. 3 makes it possible to reduce the influence of the high-frequency components of the system error and accurately obtain the surface shape of the target surface TS.

In this embodiment, the alignment error and system error are taken into consideration in step S308. However, the present invention is not limited to this. For example, the positional error of a measurement target region or the magnification error and distortion error of the measuring apparatus 1 (measuring unit 100) can also be taken into consideration. In other words, an error component such as a system error which does not change upon measurement in each measurement target region can accurately be corrected.

In this embodiment, measurement target regions equal in number to those in generating average data are used in steps S308 and S310. In steps S308 and S310, however, the measurement target regions may be thinned out so that the surface shape of the target surface is measured using measurement target regions fewer than those in generating average data. For example, in step S304, averaging is performed using all the measurement results in the eight measurement target regions shown in FIG. 2. In steps S308 and S310, only data in the minimum number of measurement target regions that cover the entire target surface may be used. In FIG. 2, data in the measurement target regions TSa2 and TSa7 may be excluded, or data in the measurement target regions TSa3 and TSa6 may be excluded. When averaging the measurement results in the measurement target regions (S304), the larger the number of measurement target regions is, the larger the effect is. However, in steps S308 and S310, there is no great difference in accuracy if a certain number of measurement target regions are used. On the other hand, decreasing the number of measurement target regions yields a great effect in shortening the calculation time and solving the problem of shortage of memory capacity in the least squares method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2009-238659 filed on Oct. 15, 2009, which is hereby incorporated by reference herein in its entirety.

What is claimed is:

1. A method of calculating a surface shape of a target surface with a calculation apparatus, the method comprising:
   a measurement data obtaining step of obtaining measurement data of the surface shape of the target surface within each of a plurality of measurement target regions, each of the plurality of measurement target regions being set to partially overlap another measurement target region on the target surface, central positions of the measurement target regions being different from each other;
   an average data generating step of generating average data by dividing a result, obtained by adding the measurement data of the surface shape of the target surface within each of the plurality of measurement target regions obtained in the measurement data obtaining step while matching the central positions of the measurement target regions, by the number of the measurement target regions to be added;
   a subtracting step of subtracting the average data generated in the generating step from the measurement data of the surface shape of the target surface within each of the plurality of measurement target regions obtained in the measurement data obtaining step; and
   a calculating step of calculating data of the surface shape of the target surface in each measurement target region using data obtained in the subtracting step, and calculating the surface shape of the target surface by combining the data of the surface shape of the target surface in each measurement target region,
   wherein the calculation apparatus has a processing unit that executes the measurement data obtaining step, the average data generating step, the subtracting step, and the calculating step.

2. The method according to claim 1, wherein the measurement data of the surface shape of the target surface within the measurement target region is data obtained by measuring heights at a plurality of positions in the target surface in the measurement target region by detecting an interference pattern formed by measurement light reflected by the measurement target region and reference light reflected by a reference surface using an image sensor.

3. The method according to claim 1, wherein the number of measurement target regions where the data of the surface shape of the target surface calculated in the calculating step is smaller than the number of measurement target regions to be added in the average data generating step.

4. The method according to claim 1, wherein a system error of a measurement apparatus that measures the measurement data of the surface shape of the target surface within the measurement target region is reduced by subtracting the average data from the measurement data of the surface shape of the target surface within each of the plurality of measurement target regions in the subtracting step.

5. The method according to claim 4, wherein:
   in the calculating step, the data of the surface shape of the target surface in each of the plurality of measurement target regions is obtained by reducing an alignment error between the measurement apparatus and the target surface and the system error of the measurement apparatus from the data obtained by subtracting the average data, and
   an order of the system error of the measurement apparatus to be reduced in the calculating step is smaller than an order of the system error of the measurement apparatus to be reduced in the subtracting step.

6. A calculation apparatus for calculating a surface shape of a target surface, the calculation apparatus comprising:
   an obtaining unit configured to obtain measurement data of the surface shape of the target surface within each of a plurality of measurement target regions, each of the plurality of measurement target regions is set to partially overlap another measurement target region on the target surface, central positions of the measurement target regions being different from each other; and
   a processing unit configured to obtaining the surface shape of the target surface based on the measurement data of the surface shape of the target surface within each of the plurality of measurement target regions obtained by the obtaining unit,
   wherein the processing unit performs:
   an average data generating task that generates average data by dividing a result, obtained by adding the measurement data of the surface shape of the target surface within each of the plurality of measurement target regions obtained by the obtaining unit while matching the central positions of the measurement target regions, by the number of the measurement target regions to be added;
   a subtracting task that subtracts the average data generated by the average data generating task from the measurement data of the surface shape of the target surface within each of the plurality of measurement target regions obtained by the obtaining unit; and
   a calculating task that calculates data of the surface shape of the target surface in each measurement target region using data obtained in the subtracting task, and calculates the surface shape of the target surface by combining the data of the surface shape of the target surface in each measurement target region.

* * * * *